March 28, 1933.　　F. O. SNOW, JR　　1,903,200
REVERSING MECHANISM
Filed Dec. 2, 1929　　2 Sheets-Sheet 1

Inventor:
Frederick O. Snow, Jr.,
by Emery, Booth, Varney & Townsend
Attys.

March 28, 1933.  F. O. SNOW, JR  1,903,200
REVERSING MECHANISM
Filed Dec. 2, 1929   2 Sheets-Sheet 2

Inventor:
Frederick O. Snow, Jr.,
by Emery, Booth, Varney & Townsend
Attys.

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

REVERSING MECHANISM

Application filed December 2, 1929. Serial No. 410,897.

This invention relates to a novel reversing mechanism, by means of which power applied to a shaft which rotates continually in one direction may be transmitted through clutches and gears to another shaft, to rotate the latter in either direction at will.

The invention will be best understood by reference to the following description, when taken in connection with the accompanying drawings of one specific embodiment thereof, while its scope will be more particularly pointed out in the appended claim.

Figure 2:
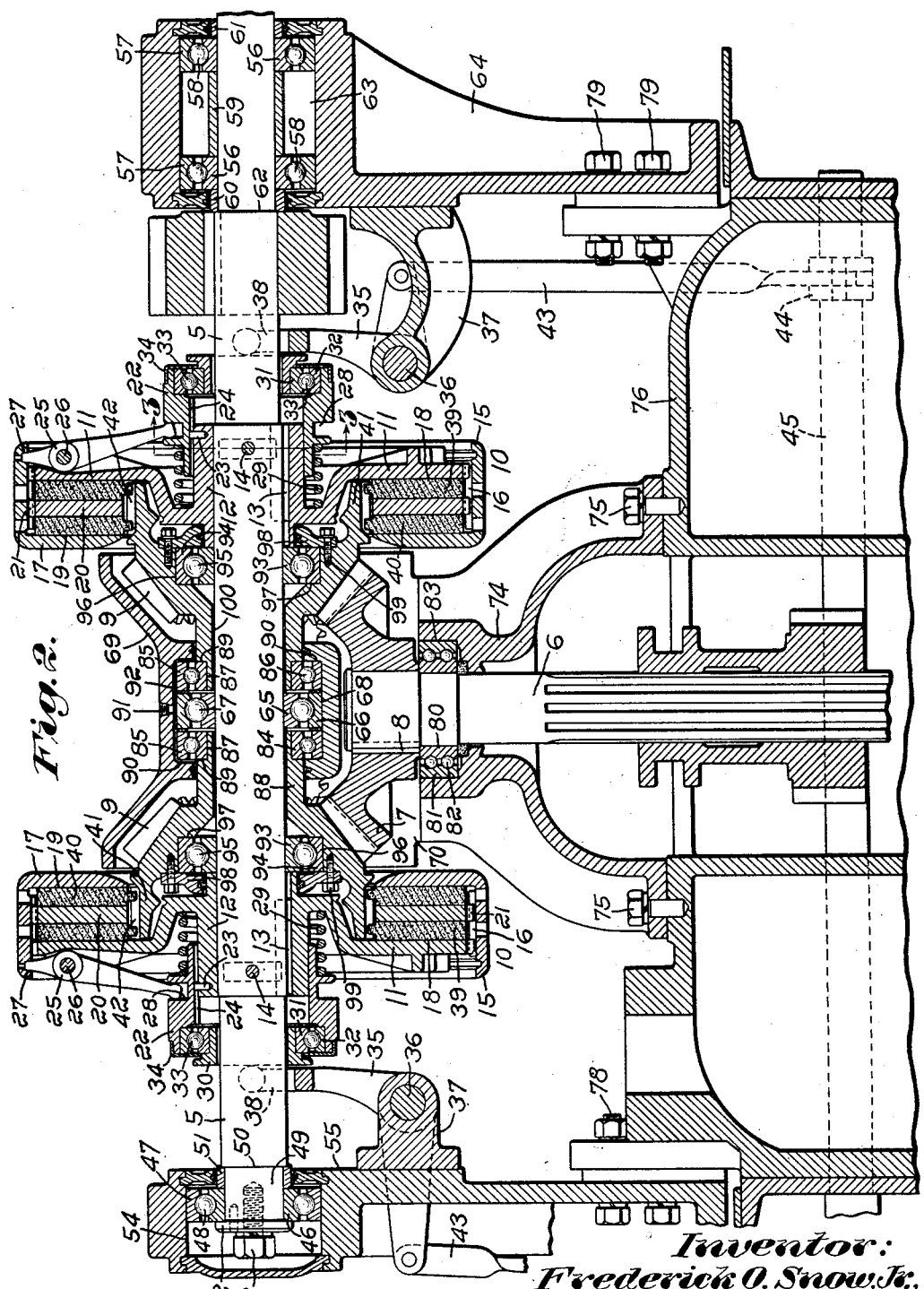
Fig. 2 is a sectional view on line 2—2 of Fig. 1.

Referring to the drawings, and to the embodiment of the invention which is illustrated therein, and having reference at first to Fig. 2, there is shown a reversing mechanism comprising a driving shaft 5, to which power is applied to drive the same continuously in one direction, and a driven shaft 6 to which power is to be transmitted to rotate the driven shaft in either direction at will. As shown in the drawings, the driven shaft is vertical, and the driving shaft is horizontal and extends across the upper end of the vertical shaft. A bevel gear 7, suitably secured as by a key 8 to the shaft 6, meshes with two bevel pinions 9, which are coaxial with the shaft 5.

With each of the bevel pinions 9 there is associated a clutch designated generally by the numeral 10, which may be of any appropriate character. As herein shown, the clutch has a driving unit, which comprises, in addition to the shaft, a driving member in the form of a disk 11, having a hub 12 suitably secured, as by a key 13 and a pin 14, to the shaft 5. The driving unit also comprises a ring 15, movable axially with relation to the disk 11, and having driving connection therewith, as by splines 16. A second friction disk 17 is carried by the ring, and herein is formed as an integral part thereof. The two disks have friction faces 18 and 19, respectively, which face each other. The driving unit, as herein shown, comprises a third friction disk 20, interposed between and movable axially with relation to the first and second disks, and having driving connection with the ring 15, as by splines 21.

The driving unit further includes a sleeve 22, which is movable axially with relation to the driving disk 11, and is conveniently supported by the hub 12 of the latter. There is a suitable driving connection between the sleeve and the hub, herein a radially disposed pin 23 carried by the hub and received in a longitudinal groove 24 presented by the sleeve. Axial movement is communicated from the sleeve 22 to the ring 15 by a plurality of levers, one of which is shown at 25, each lever being fulcrumed intermediate its ends on a pin 26 on the disk 11. The outer end of each lever is received in an annular groove 27 in the ring 15, and the inner end in an annular groove 28 in the sleeve 22. Thus, axial movement of the sleeve in one direction is accompanied by axial movement of the ring in the opposite direction. The clutch is engaged by an external force applied to the sleeve 22 to move the latter in an inward direction, while disengagement is effected by a spring 29 interposed between the sleeve 22 and the disk 11.

A thrust collar 30 is connected to the sleeve 22 by a thrust bearing, herein comprising inner and outer ball-rates 31 and 32, and a set of balls 33. A sheet metal cap 34, secured to the sleeve and overlying the outer end of the ball-bearing, excludes foreign matter from, and retains lubricant within the bearing. The thrust collar is supported by the sleeve, and has no engagement with the shaft.

From the foregoing, it is evident that the described parts which constitute the driving unit derive their support from the shaft, and yet the only one which engages the shaft is the disk 11, whose hub is secured to the shaft. As a result, the thrust is self-contained with the rotating clutch member, and the rotating parts constitute a unit, so that all thrusts applied to the clutch are received by the disk 11, and transmitted directly to the shaft 5, axial movement of which is prevented in the manner which will presently appear. The force which is applied to effect engagement of the clutch is transmitted to the thrust collar 31 by a bell-crank lever 35, which is mounted on a pivot 36 on a support 37, and is formed to present arms 38, which engage the outer end of the thrust collar 31.

The driven unit comprises two friction disks 39 and 40, which are capable of axial movement and are disposed at opposite sides, respectively, of the disk 20, and between the latter and the disks 11 and 17. The driven unit also comprises a driven member 41, having suitable driving connection with the disks 39 and 40, as by splines 42.

The clutch-operating, bell-crank levers 35 are actuated by links 43, one of which is shown in the drawings as being pivotally connected at its lower end to an arm 44 secured to a horizontal rockshaft 45. In practice, the other link is similarly connected to a sleeve coaxial with the rockshaft in a manner to cause one clutch to be engaged while the other is disengaged, and with an intermediate position in which neither is engaged, but the mechanism which coordinates these movements is no part of the present invention, and is not illustrated herein.

The driving shaft 5 and the bevel pinions 9 are supported in a novel manner, which will now be described, reference still being had to Fig. 2. One end of the shaft (the left-hand end, as shown in Fig. 2) is supported in an axially floating bearing, which, as shown, comprises inner and outer ball races 46 and 47, which are grooved to receive a set of balls 48. The inner race is appropriately secured to the shaft, as by providing the latter with a reduced portion 49 and a shoulder 50. The inner race and the collar 51 are interposed between the shoulder 50 and a clamping washer 52, which is held in place by a cap-screw 53, threaded into the end of the shaft. The outer race is loosely received in a cylindrical bore 54, presented by a side-frame member 55, and therefore affords a floating support for the shaft.

The other end of the shaft is supported in a generally similar manner, herein by two ball bearings, each comprising inner and outer ball races 56 and 57, grooved to receive a set of balls 58. The inner races are spaced from each other by a collar 59, and there are two other collars 60 and 61 on the outer sides of the ball bearings. The collar 60 rests against a shoulder 62 presented by the shaft. This shoulder constitutes an abutment against which the races 56 and collars 60 and 61 are clamped by appropriate means, not shown herein, but analogous to the clamping means at the other end of the shaft. It is deemed unnecessary to show the second clamping means, as the same is not essential to an understanding of the present invention. In this case, as is the case with the other end of the shaft, the outer ball races are mounted to float axially, as by being received in a cylindrical bore 63, presented by a side-frame member 64.

Figure 1:
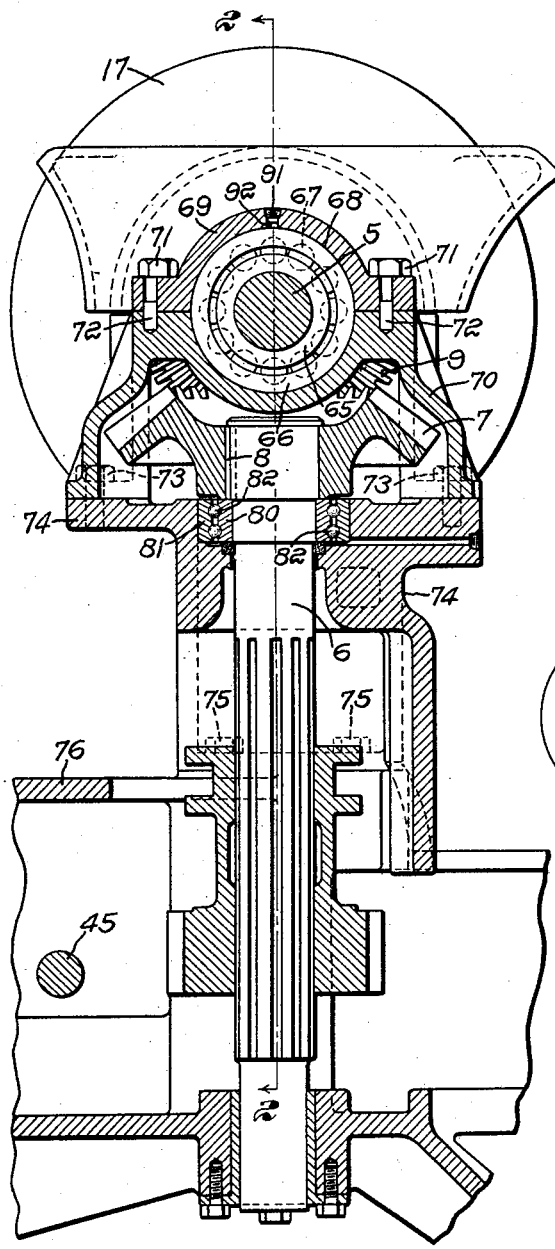
Fig. 1 is a vertical sectional view of a reversing mechanism embodying the invention.
Figure 3:
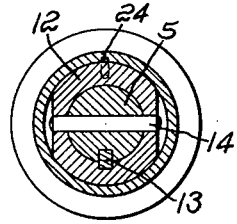
Fig. 3 is a sectional view on line 3—3 of Fig. 2.

The central portion of the shaft is supported by a third bearing, herein a ball-bearing comprising inner and outer ball-races 65 and 66, grooved to receive a set of balls 67. The inner race is not secured to the shaft, but turns therewith, because there is sufficient friction between the race and the shaft to cause them to turn together. The outer race is received in a cylindrical bore 68, presented by an appropriate fixed support, the latter, as shown in Fig. 1 comprising a cap 69 and a yoke 70 suitably secured together as by cap screws 71, and held in proper registration with each other, as by dowel pins 72. The yoke 70 is suitably secured, as by cap-screws 73, to an underlying support, herein a bracket 74 which, as shown in Fig. 2, is in the form of a yoke, and is secured, as by cap-screws 75, to a bed or frame 76. In case the reversing mechanism is used in connection with a crane, the main frame 76 constitutes the turn-table of the crane. The side frame members 55 and 64 are secured to the turn-table, as by bolts 78 and 79. The yoke-like bracket 74 affords a support for a ball bearing, herein comprising inner and outer races 80 and 81, curved to receive two sets of balls 82. The inner race is disposed about and turns with the vertical shaft 6, while the outer race is received in and is fixed with relation to a cylindrical bore 83, presented by the yoke-like bracket 74.

Returning now to the bevel pinions 9, the bearings for these pinions will be described, reference being had to Fig. 2. At either side of the ball bearing composed of the ball races 65 and 66 and the set of balls 67, there is a ball bearing comprising inner and outer rings 84 and 85, grooved to receive a set of balls 86. The inner race is fitted on and about a reduced portion 87 of a hub 88, presented by the bevel pinion 9, and this reduced portion terminates at one end in a shoulder 89 against which the ball race abuts. On the other hand, the outer race 85 is fitted into the cylindrical bore 68 presented by the cap 69 and yoke 70, which also present a shoulder or abutment 90, against which one end of the outer ball race is fitted. The three ball bearings composed of the races 65 and 66, the balls 67 and the two sets of races 84, 85 and balls 86, completely fill the space between the shoulders or abutments 90 at either end, as a result of which these ball bearings cannot move axially. It follows that the left-hand bevel pinion 9 cannot move axially toward the right and the right-hand bevel pinion cannot move axially toward the left. At the upper side of the ball bearing, the cap 69 is provided with a hole 91 and a communicating groove 92, which extends longitudinally of the bearings, and radially inward at each end of the group of bearings to feed lubricant to the latter.

Each of the pinions 9 also derives support from another ball bearing, comprising inner and outer ball races 93 and 94, grooved to receive a set of balls 95. The inner race is fitted onto and rotates with the shaft, while the outer race is fitted into a cylindrical bore 96 presented by the pinion, and this bore terminates at one end in a shoulder 97, against which one end of the outer ball race is fitted, while the other end of such ball race rests against a retaining plate 98, which is secured, as by cap-screws 99 to the pinion. Thus the outer ball race cannot move axially with relation to the pinion. The outer end of the inner ball race rests endwise against the hub 12 of the driving disk 11 of the clutch, and this disk, it will be remembered, is secured against axial movement with relation to the shaft by a pin 14. As herein shown, the hub of each pinion is separated from the shaft by a clearance space 100. As a consequence of the described construction, including the three centrally located ball bearings and the two pins 14, each bevel pinion is held against axial displacement. The pins 14 transfer the thrusts to the shaft, and the shaft in turn is held against axial movement by the central bearings. Thus, it is evident that the shaft is supported by an intermediate bearing and two end bearings, that the intermediate bearing is so related to the pinions and to the clutches as to receive all end thrusts on the shaft, and that the end bearings simply afford support for the shaft, but without restraining it against axial movement, and hence do not resist any thrusts. The advantage of this construction is compactness, rigidity and simplicity, and the proper relationship between the bevel pinions and the bevel gear which they drive cannot be disturbed. The gears are bound to be meshed properly at all times. This relationship cannot be disturbed, because it is maintained by the center bearing, which is fixed with relation to the frame. It is apparent that, under these circumstances, there is no necessity of providing end adjustments for the horizontal shaft.

Having thus described one embodiment of the invention, but without limiting myself thereto, what I claim and desire by Letters Patent to secure is:

In a reversing mechanism, the combination of a driven shaft, a driving shaft extending across one end of said driven shaft, a bevel gear secured to said driven shaft, two bevel pinions meshing with said bevel gear and coaxial with said driving shaft, two clutches by which power may be transmitted from said driving shaft to either of said pinions, thereby to cause said driven shaft to be driven in either direction, said clutches comprising driving members secured to said driving shaft and driven members between said driving member and having driving connection with said pinions, respectively, two bearings which afford support for said pinions, respectively, on and about said driving shaft between said driving members, a frame presenting a fixed support between said driving members, two bearings deriving support from and held against axial movement with relation to said fixed support and in turn afford support for said pinions, respectively, and holding said pinions against axial movement, an intermediate bearing deriving support from said fixed support and in turn supporting said driving shaft between said pinions, said driving members cooperating with said intermediate bearing and said support to restrain said driving shaft against axial movement, and two end bearings deriving support from said frame and affording floating supports for the outer ends of said driving shaft.

In testimony whereof, I have signed my name to this specification.

FREDERICK O. SNOW, Jr.

CERTIFICATE OF CORRECTION.

Patent No. 1,903,200.                                                        March 28, 1933.

FREDERICK O. SNOW, JR.

It is hereby certified that error appears in the printed specification of the above numbered patent requiring correction as follows: Page 1, line 84, for "ball-rates" read "ball-races"; page 3, line 71, the claim, for "member" read "members", and line 79, for "affcrd" read "affording"; and that the said Letters Patent should be read with these corrections therein that the same may conform to the record of the case in the Patent Office.

Signed and sealed this 16th day of May, A. D. 1933.

M. J. Moore.

(Seal)                                                      Acting Commissioner of Patents.